Dec. 18, 1934.  J. H. FULMER  1,984,829
BALE DRIER
Filed Aug. 3, 1933  2 Sheets-Sheet 1
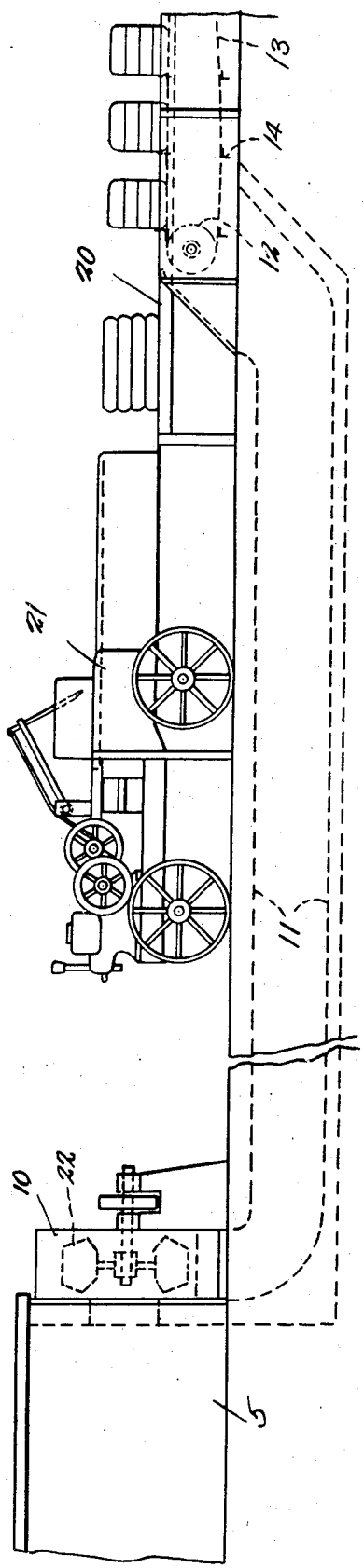
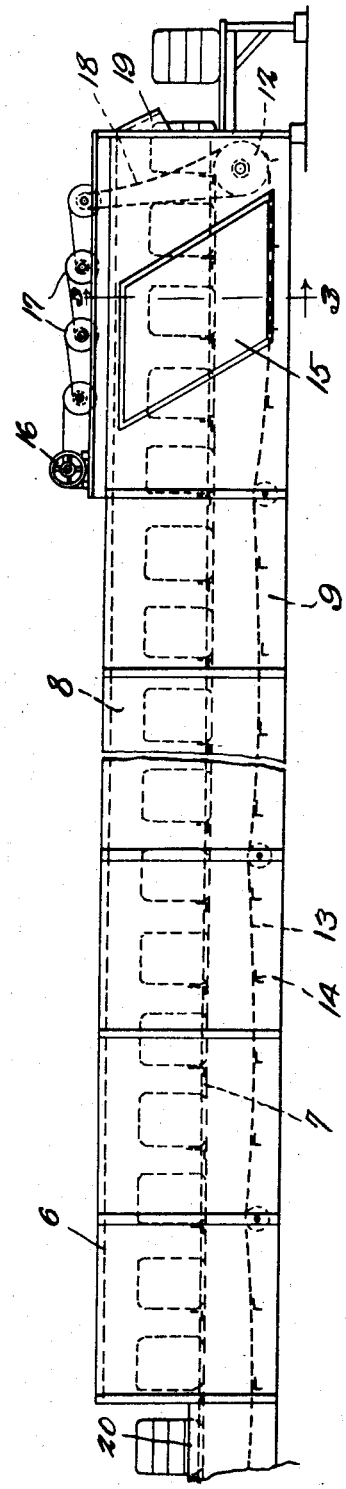
J. H. Fulmer Inventor
By C. A. Snow & Co.
Attorneys.

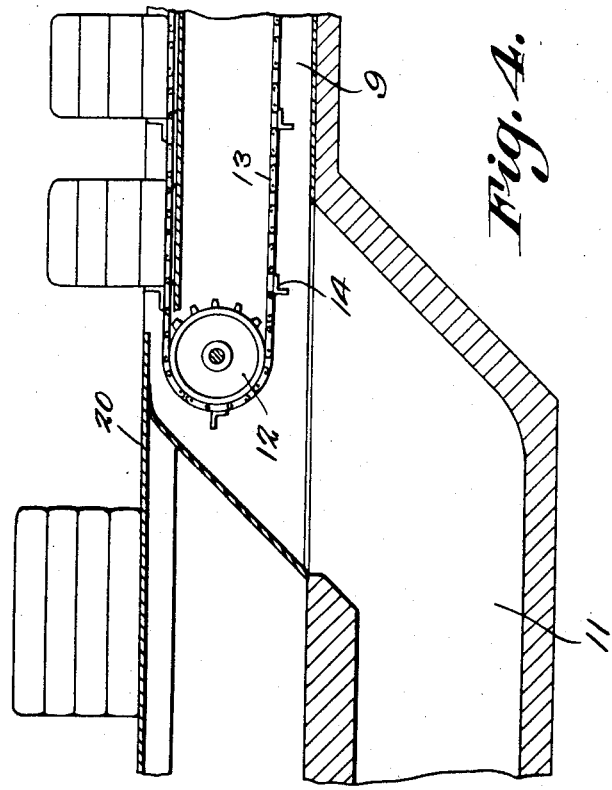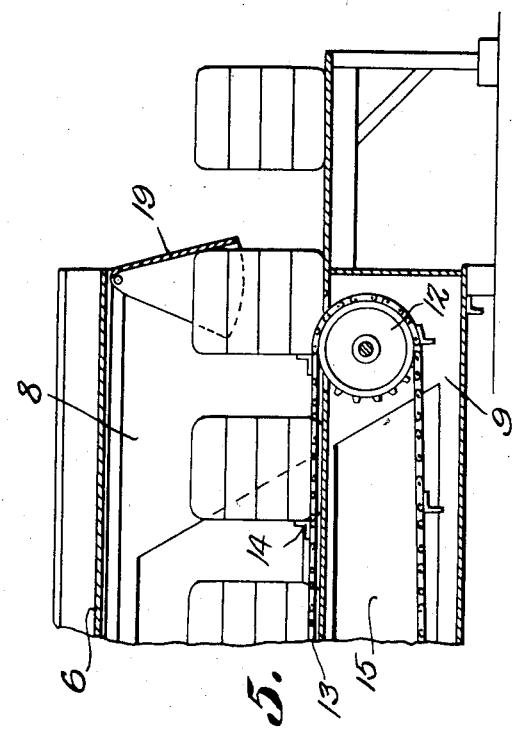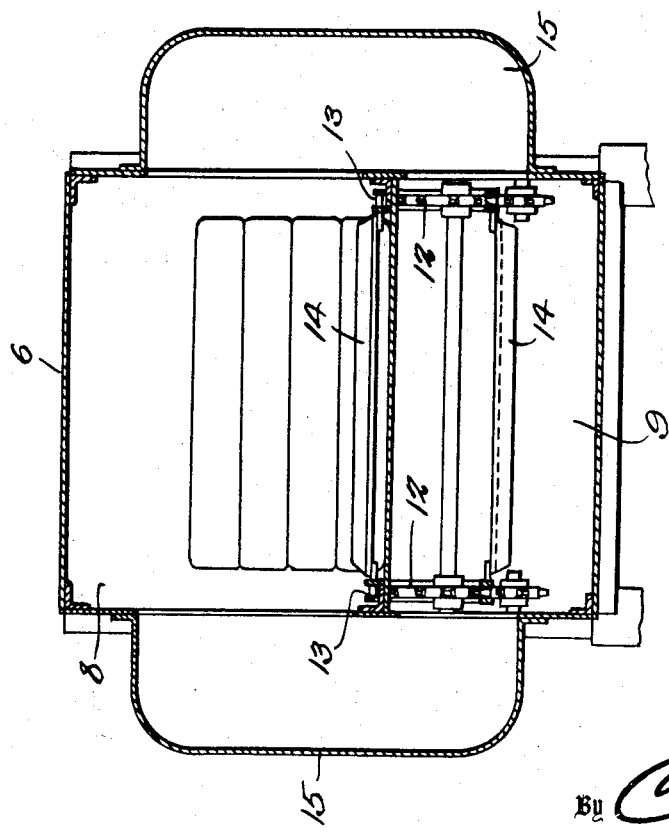

Patented Dec. 18, 1934

1,984,829

UNITED STATES PATENT OFFICE 1,984,829

BALE DRIER

Joseph Henry Fulmer, Nazareth, Pa.

Application August 3, 1933, Serial No. 683,526

2 Claims. (Cl. 34—24)

This invention relates to a device designed for use in curing baled hay or other green forage crops containing a high percentage of moisture.

The primary object of the invention is to provide a device of this character having means for holding the bales under treatment, in proper spaced relation with each other, during the passage of the bales through the device, whereby the heat will be permitted to circulate freely around the bales, accomplishing the curing result.

Another object of the invention is to provide a device of this character whereby the bales will be fed from the baling machine, directly to the endless conveyor of the device, where the bales are carried through the curing chamber at a slow rate of speed, to insure the curing of the material under treatment.

A still further object of the invention is to provide means at the discharge end of the device to automatically open by contact with the bales passing through the machine, the means closing by gravity to retain the heat in the curing chamber of the device, after the bales have passed through the device.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view illustrating the feed end of the curing device.

Figure 2 is a side elevational view indicating the main portion and discharge end of the curing chamber, the structure shown by Figure 2, constituting a continuation of the construction shown by Figure 1.

Figure 3 is a sectional view taken on line 3—3 of Figure 2.

Figure 4 is an enlarged sectional view through the forward end of the curing chamber.

Figure 5 is an enlarged sectional view through the discharge end of the curing chamber.

Referring to the drawings in detail, the reference character 5 designates the mixing chamber of the device, which is in communication with a source of heat supply such as a furnace or the like.

The reference character 6 designates the curing chamber which is in the form of an elongated housing divided throughout its length, by means of the plate 7 disposed substantially centrally of the curing chamber, dividing the curing chamber into an upper compartment 8 and a lower heat compartment 9.

At one end of the mixing chamber 5, is a blower housing 10, which is in communication with the heat compartment 9, through the hot air duct 11, which extends downwardly from the blower housing 10, and extends under the surface on which the mixing chamber and curing chamber are positioned, thereby insulating the hot air duct.

The opposite end of the hot air duct extends upwardly and connects with the curing chamber to direct heat to the heat compartment 9 directly under the plate 7, heating the plate 7, to accomplish the purpose of the invention.

At each end of the curing chamber, is a sprocket 12, over which sprockets the endless conveyor, forming an important feature of the invention, operates. This endless conveyor embodies spaced chains 13 that are connected by means of the angle bars 14, which angle bars are spaced appreciable distances apart, so that the bales engaged by the angle bars, will be held in spaced relation with respect to each other, permitting of a free circulation of hot air, around the bales, as they move gradually through the curing chamber.

Arranged near the discharge end of the curing chamber, are lateral by-passes 15 which establish communication between the heat compartment 9 and compartment 8, directly thereabove, so that the heat, after it has passed through the heat compartment, heating the plate 7, the heat will be directed upwardly into the compartment 8, where it travels towards the feed end of the curing chamber, or in a direction opposite to the direction of travel of the bales, in passing through the curing chamber.

The reference character 16 designates a motor, which is mounted above the curing chamber, the motor transmitting power to the gearing 17, which in turn transmits motion to operate the endless conveyor, the power being transferred through the medium of the chain 18.

The discharge end of the curing chamber, is provided with a hinged trap door 19, which closes the upper portion of the discharge end of the curing chamber, the trap door being hinged in such a way that contact with the bales passing through the machine, will act to swing the hinged trap door upwardly, releasing the bales.

Due to this construction, as each bale passes through the curing chamber, the trap door swings by gravity to its normal closed position.

Disposed at the feed end of the curing chamber, is a platform 20, which platform is disposed above the receiving end of the endless conveyor, as clearly shown by Figure 4 of the drawings, with the result that the bales under treatment, may be slid over the platform, and dropped onto the plate 7, where they are picked up by the endless conveyor and moved through the machine.

This platform 20 is so arranged that the usual baling machine, which in the present showing is indicated by the reference character 21, may be moved to a position to deposit baled material onto the platform.

It might be further stated that a blower indicated by the reference character 22, operates within the blower housing 10, and acts to force heat through the hot air duct 11, and into the curing chamber.

In view of the foregoing disclosure, it is believed that a further detailed description as to the operation of the device is unnecessary, for a complete understanding of the invention.

Having thus described the invention what is claimed is:

1. The method of curing baled green forage crops, consisting in providing an oven, and an endless carrier operating through the oven, placing the bales to be dried on the carrier in predetermined spaced relation with each other, the bales being of a size with respect to the oven, to retard the passage of hot air through the oven, and finally subjecting the bales to the action of hot air forced through the oven at high velocity.

2. The method of curing baled green forage crops, consisting in moving bales of forage crop through an oven in one direction, and subjecting the bales to hot air passing through the oven at high velocity, and in a direction opposite to the direction of travel of the bales under treatment.

JOSEPH HENRY FULMER.